(12) United States Patent
Englund et al.

(10) Patent No.: US 11,972,032 B2
(45) Date of Patent: Apr. 30, 2024

(54) AUTHENTICATION OF AN ORIGINAL EQUIPMENT MANUFACTURER ENTITY

(71) Applicant: TELEFONAKTIEBOLAGET LM ERICSSON (PUBL), Stockholm (SE)

(72) Inventors: Håkan Englund, Lund (SE); Bernard Smeets, Dalby (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 396 days.

(21) Appl. No.: 17/290,827

(22) PCT Filed: Nov. 2, 2018

(86) PCT No.: PCT/EP2018/080056
§ 371 (c)(1),
(2) Date: May 3, 2021

(87) PCT Pub. No.: WO2020/088783
PCT Pub. Date: May 7, 2020

(65) Prior Publication Data
US 2021/0374287 A1    Dec. 2, 2021

(51) Int. Cl.
*G06F 21/73* (2013.01)
*G06F 21/44* (2013.01)
(Continued)

(52) U.S. Cl.
CPC ............. *G06F 21/73* (2013.01); *G06F 21/44* (2013.01); *G06F 21/602* (2013.01); *H04L 9/3271* (2013.01); *G06F 2221/2103* (2013.01)

(58) Field of Classification Search
CPC ........ G06F 21/73; G06F 21/44; G06F 21/602; G06F 2221/2103; H04L 9/3271
See application file for complete search history.

(56) References Cited

U.S. PATENT DOCUMENTS 8,280,351 B1 * 10/2012 Ahmed ................. H04W 12/08
455/433
8,868,915 B2 * 10/2014 Counterman ......... H04L 63/062
713/176
(Continued)

FOREIGN PATENT DOCUMENTS

EP    2487618 A2      8/2012
EP    3346415 A2 *   7/2018   ......... G06F 15/0208

*Primary Examiner* — Darshan I Dhruv
(74) *Attorney, Agent, or Firm* — Weisberg I.P. Law, P.A.

(57) ABSTRACT

There is provided mechanisms for authenticating an OEM entity as manufacturer of a communication device comprising an identification module. A method is performed by a network entity. The method comprises providing, towards tire identification module, a challenge of a challenge-response authentication procedure. The method comprises obtaining, from the identification module, a first response of the challenge-response authentication procedure. The method comprises providing, towards the OEM entity and upon having obtained the response, the challenge. The method comprises obtaining, from the OEM entity, a second response of the challenge-response authentication procedure. The method comprises authenticating the OEM entity as the manufacturer of the communication device only when the second response matches the first response.

18 Claims, 10 Drawing Sheets

(51) Int. Cl.
*G06F 21/60* (2013.01)
*H04L 9/32* (2006.01)

(56) References Cited

U.S. PATENT DOCUMENTS

| | | | | |
|---|---|---|---|---|
| 9,369,469 B2* | 6/2016 | Gregg | | H04L 63/0853 |
| 9,749,303 B2* | 8/2017 | Warnez | | G06Q 20/3552 |
| 10,002,277 B1* | 6/2018 | Endress | | G06K 7/1417 |
| 2012/0108295 A1* | 5/2012 | Schell | | H04W 4/60 |
| | | | | 235/375 |
| 2012/0144202 A1* | 6/2012 | Counterman | | H04L 63/0876 |
| | | | | 713/176 |
| 2012/0234908 A1* | 9/2012 | Wang | | H04L 9/3268 |
| | | | | 235/375 |
| 2013/0185552 A1* | 7/2013 | Steer | | H04N 21/6582 |
| | | | | 713/156 |
| 2015/0134552 A1* | 5/2015 | Engels | | G06Q 10/087 |
| | | | | 705/318 |
| 2015/0139424 A1* | 5/2015 | Campagna | | H04L 9/0866 |
| | | | | 380/270 |
| 2015/0318998 A1* | 11/2015 | Erlikhman | | H04L 63/0853 |
| | | | | 713/171 |
| 2016/0042032 A1* | 2/2016 | Rosati | | H04L 9/3247 |
| | | | | 235/375 |
| 2016/0080944 A1* | 3/2016 | Colegate | | H04L 63/06 |
| | | | | 455/410 |
| 2016/0098723 A1* | 4/2016 | Feeney | | G06Q 20/065 |
| | | | | 705/75 |
| 2016/0171223 A1 | 6/2016 | Covey et al. | | |
| 2016/0344560 A1* | 11/2016 | Caceres | | H04W 12/04 |
| 2016/0373418 A1* | 12/2016 | Ståhl | | G06F 21/44 |
| 2017/0104750 A1 | 4/2017 | Li et al. | | |
| 2017/0188234 A1 | 6/2017 | Schell et al. | | |
| 2017/0244697 A1* | 8/2017 | Caceres | | H04L 9/3297 |
| 2017/0317997 A1* | 11/2017 | Smith | | H04L 9/14 |
| 2018/0034682 A1 | 2/2018 | Gulati | | |
| 2018/0159857 A1* | 6/2018 | Souto | | H04W 76/10 |
| 2019/0034920 A1* | 1/2019 | Nolan | | H04L 9/50 |
| 2019/0349261 A1* | 11/2019 | Smith | | G06F 16/1824 |

* cited by examiner

AUTHENTICATION OF AN ORIGINAL EQUIPMENT MANUFACTURER ENTITY

PRIORITY CLAIM

This application is a national stage application of International Patent Application No. PCT/EP2018/080056, filed Nov. 2, 2018, the disclosure disclosures of which is hereby incorporated in its entirety by reference.

TECHNICAL FIELD

Embodiments presented herein relate to methods, a network entity, an identification module, an original equipment manufacturer (OEM) entity, computer programs, and a computer program product for authenticating the OEM entity as manufacturer of a communication device comprising the identification module.

BACKGROUND

Digital identities are used, amongst others, for authentication, setting up secure communication channels, and for proving ownership of data. To create a digital identity, henceforth just referred to as identity, an issuer of the identity could link a cryptographic key as a credential to an identifier. This identifier can be a number, a text string, or any other digital representation of an element of a namespace, the set of all possible identifiers. A well-known example is a Public-Key Infrastructure (PKI) where the identities are the issued certificates, where the credentials are some public-key cryptographic key pairs, e.g. using the Rivest-Shamir-Adleman (RSA) public cryptosystems. Identifiers in a PKI are commonly the subject name that the certificate carries, but also other fields in a certificate can be used as the identifier.

While PKIs are well-known and widely used, for example, when using Transport Layer Security (TLS) connections to realize secure connections between a terminal device, such as a mobile phone, and a server, identities that are using symmetric key cryptosystems are widely used too. In fact, such symmetric key identities are, for example, used and are mandatory to support in the second, third, fourth, and fifth generation mobile network systems as standardized by the 3rd Generation Partnership Project (3GPP).

Compared to public-key cryptosystems, the symmetric key cryptosystems are faster and require keys of smaller sizes than keys used in the public-key cryptosystems. This is attractive for use in battery driven devices, such as mobile phones, and, particularly, constraint Internet of Things (IoT) devices.

However, for symmetric key cryptosystems the verifier (i.e., the entity that is to verify an identity of another entity) needs the same key as the prover (i.e., the entity that claims to have a said identity). But if the verifier has the same key, then the verifier can easily impersonate the prover. Hence, the prover must trust the verifier to not use or disclose this key it shares with the prover. Furthermore, the key management of symmetric keys does not allow the key to be shared from the prover to verifier during the system setup.

Most commonly used public-key cryptosystems are insecure when confronted with an attacker using a quantum computer. But symmetric key cryptosystems are known to be robust against being attacked by an attacker having access to a quantum computer. In the worst case, the prover has to switch to a scheme using a larger key size.

One issue with identities symmetric cryptosystems is the fact that the verifier must have the same key as used by the prover when proving the verifier is in possession of the secret key. Furthermore, the key must be securely made available at/to the verifier when needing it in, say, an authentication or identification process. Transporting the key to a verifier via an encrypted channel assumes there is already a key in place between the prover and the verifier. The latter might in certain setups be useful but, in general, there could be scenarios in which it is beneficial to not require that the verifier and the prover already have keys available from the start.

The above issues limit the possibility to be a verifier as it forces the prover to have different keys for each verifier. For example, in a system with N entities that all can act as provers and verifiers, the number of keys needed would be $N \cdot (N-1)/2$, which is forbiddingly large when the value of N grows, as would be the case with billions of constrained devices that have limited storage capabilities.

Hence, there is still a need for improved mechanisms for authentication of devices.

SUMMARY

An object of embodiments herein is to provide mechanisms that enable efficient authentication of an OEM as manufacturer of a communication device.

According to a first aspect there is presented a method for authenticating an OEM entity as manufacturer of a communication device comprising an identification module. The method is performed by a network entity. The method comprises providing, towards the identification module, a challenge of a challenge-response authentication procedure. The method comprises obtaining, from the identification module, a first response of the challenge response authentication procedure. The method comprises providing, towards the OEM entity and upon having obtained the response, the challenge. The method comprises obtaining, from the OEM entity, a second response of the challenge-response authentication procedure. The method comprises authenticating the OEM entity as the manufacturer of the communication device only when the second response matches the first response.

According to a second aspect there is presented a network entity for authenticating an OEM entity as manufacturer of a communication device comprising an identification module. The network entity comprises processing circuitry. The processing circuitry is configured to cause the network entity to provide, towards the identification module, a challenge of a challenge-response authentication procedure. The processing circuitry is configured to cause the network entity to obtain, from the identification module, a first response of the challenge-response authentication procedure. The processing circuitry is configured to cause the network entity to provide, towards the OEM entity and upon having obtained the response, the challenge. The processing circuitry is configured to cause the network entity to obtain, from the OEM entity, a second response of the challenge-response authentication procedure. The processing circuitry is configured to cause the network entity to authenticate the OEM entity as the manufacturer of the communication device only when the second response matches the first response.

According to a third aspect there is presented a computer program for authenticating an OEM entity as manufacturer of a communication device comprising an identification module. The computer program comprises computer program code which, when run on processing circuitry of a network entity, causes the network entity to perform a method according to the first aspect.

According to a fourth aspect there is presented a method for authenticating an OEM entity as manufacturer of a communication device comprising an identification module. The method is performed by the identification module. The method comprises obtaining, from a network entity, a challenge of a challenge-response authentication procedure. The method comprises providing, towards the network entity, a first response of the challenge response authentication procedure.

According to a fifth aspect there is presented an identification module for authenticating an OEM entity as manufacturer of a communication device comprising the identification module. The identification module comprises processing circuitry. The processing circuitry is configured to cause the identification module to obtain, from a network entity, a challenge of a challenge-response authentication procedure. The processing circuitry is configured to cause the identification module to provide, towards the network entity, a first response of the challenge-response authentication procedure.

According to an sixth aspect there is presented a computer program for authenticating an OEM entity as manufacturer of a communication device comprising an identification module. The computer program comprises computer program code which, when run on processing circuitry of the identification module, causes the identification module to perform a method according to the fourth aspect.

According to a seventh aspect there is presented a method for authenticating an OEM entity as manufacturer of a communication device comprising an identification module. The method is performed by the OEM entity. The method comprises obtaining, from a network entity, a challenge of a challenge-response authentication procedure. The method comprises providing, towards the network entity, a second response of the challenge response authentication procedure.

According to an eight aspect there is presented an OEM entity for authenticating the OEM entity as manufacturer of a communication device comprising an identification module. The OEM entity comprises processing circuitry. The processing circuitry is configured to cause the OEM entity to obtain, from a network entity, a challenge of a challenge-response authentication procedure. The processing circuitry is configured to cause the OEM entity to provide, towards the network entity, a second response of the challenge-response authentication procedure.

According to a tenth aspect there is presented a computer program for authenticating an OEM entity as manufacturer of a communication device comprising an identification module. The computer program comprises computer program code which, when run on processing circuitry of the OEM entity, causes the OEM entity to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously these methods, this network entity, this identification module, this OEM entity, these computer programs, and this computer program product provide efficient authentication of the OEM entity as manufacturer of the communication device.

Advantageously these methods, this network entity, this identification module, this OEM entity, these computer programs, and this computer program product are efficient for constrained communication devices that have limited computation and storage capabilities.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

In view of the above there is need for symmetric cryptography based identities that are easily manageable and for which there exist an identity issuance process and key infrastructure that avoids the above issues. The herein disclosed embodiments provide a framework in which a device owner can authenticate and bind a device manufacturer to a specific device based on a symmetric key infrastructure. In this respect, the Authentication Key Agreement (AKA) procedures of current 3GPP technologies for wireless communication support symmetric key based authentication towards a tamper resistant identity module that holds the credentials. But there is no means to establish in which device the identity module is used.

Figure 1:
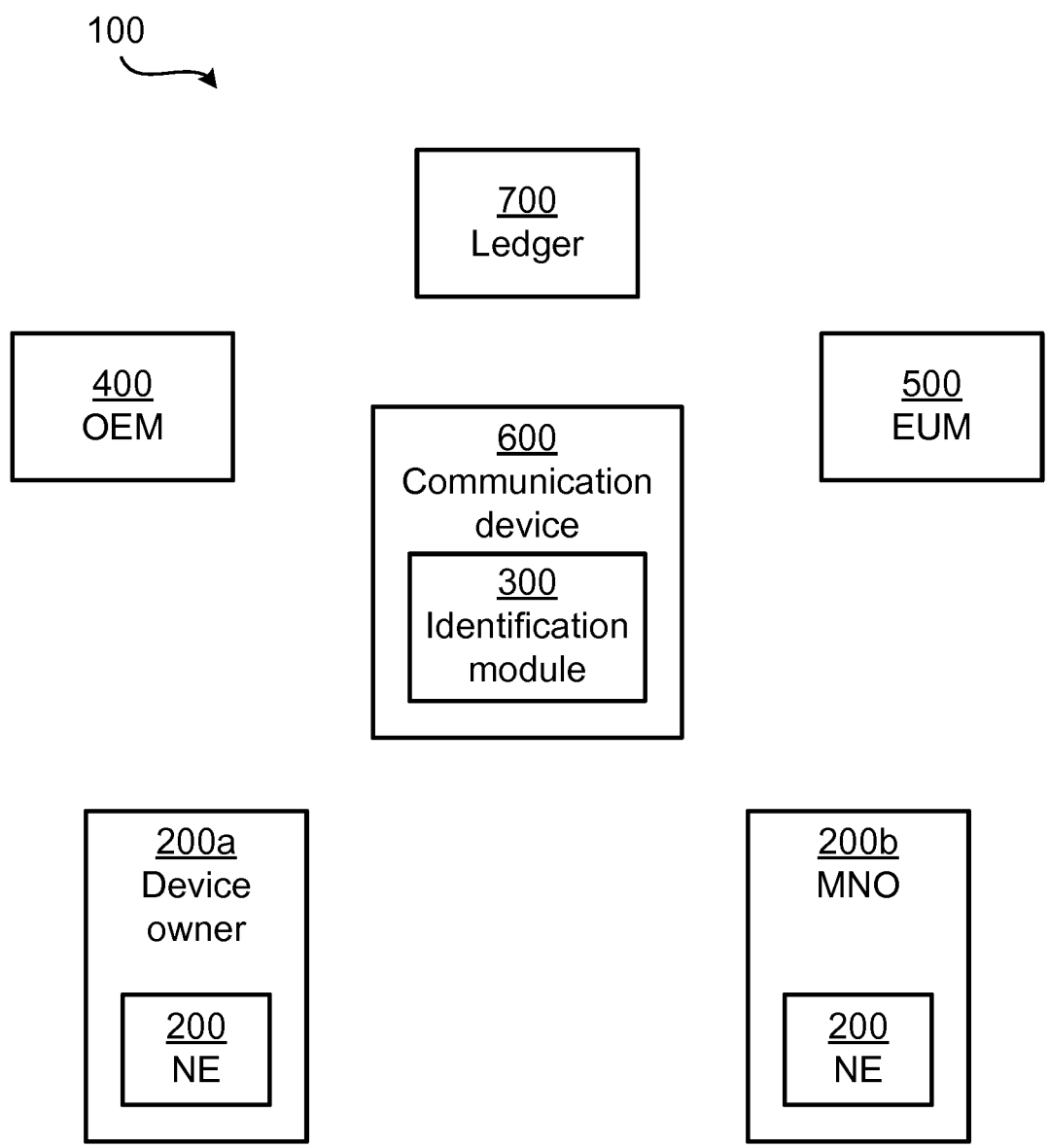
FIG. 1 is a schematic diagram illustrating a system according to embodiments.

FIG. 1 is a schematic diagram illustrating a system 100 where embodiments presented herein can be applied. The system 100 comprises a communication device 600. There could be different types of communication devices 600. Examples include, but are not limited to, portable wireless devices, mobile stations, mobile phones, handsets, wireless local loop phones, user equipment (UE), smartphones, laptop computers, tablet computers, network equipped vehicles, network equipped sensors, and IoT devices.

The communication device 600 comprises an identification module 300. The identification module 300 has been manufactured by a manufacturing entity 500 (in FIG. 1 denoted "EUM" being short for eUICC manufacturer, thus representing an illustrative example where the identification module 300 is an embedded UICC (eUICC). There could be different examples of identification modules 300. In some examples the identification module 300 is part of, or implemented on, a Trusted Execution Environment (TEE). In particular, in some aspects the identification module 300 is a Universal Integrated Circuit Card (UICC), such as an eUICC or an integrated UICC (iUICC). That is, the TEE could be realized as any type of UICC, such as an eUICC or an iUICC (or a traditional UICC).

The system 100 further comprises an original equipment manufacturer OEM entity 400 claiming to have manufactured the communication device 600. The authenticity of the OEM entity 400 as true manufacturer of the communication device 600 is assumed to be verified by a network equipment (NE) 200. The network equipment 200 could be managed by, executed by, integrated with, collocated with, or part of, a mobile network operator (MNO) entity 200b or a device owner entity 200a. Thus, in some aspects the network entity 200 is a device owner entity 200a or an MNO entity 200b.

The system too further comprises a ledger 700 as representing any sort of external data register and storage.

In some aspects, the herein disclosed embodiments proposes to use mechanisms according to which the credential, stored in the identification module 300 of the communication device 600, is used as a basis for authentication of the OEM entity 400 of the communication device 600 comprising the identification module 300. This allows a device owner entity 200a to in a reliable manner establish that this particular OEM entity 400 has indeed produced this particular communication device 600 comprising this particular identification module 300. Furthermore, the MNO that operates the network has, by means of the MNO entity 200b, the ability to perform a trustworthy verification that the credentials used in the identity for network access are securely stored. The MNO can thus verify that there is no risk that the communication device 600 will leak the secret, which would ruin the ability to identify securely the subscriber that operates the communication device 600.

The embodiments disclosed herein in particular relate to mechanisms for authenticating an OEM entity 400 as manufacturer of a communication device 600 comprising an identification module 300. In order to obtain such mechanisms there is provided a network entity 200, a method performed by the network entity 200, a computer program product comprising code, for example in the form of a computer program, that when run on processing circuitry of the network entity 200, causes the network entity 200 to perform the method. In order to obtain such mechanisms there is further provided an identification module 300, a method performed by the identification module 300, and a computer program product comprising code, for example in the form of a computer program, that when run on processing circuitry of the identification module 300, causes the identification module 300 to perform the method. In order to obtain such mechanisms there is further provided an OEM entity 400, a method performed by the OEM entity 400, and a computer program product comprising code, for example in the form of a computer program, that when run on processing circuitry of the OEM entity 400, causes the OEM entity 400 to perform the method.

Figure 2:
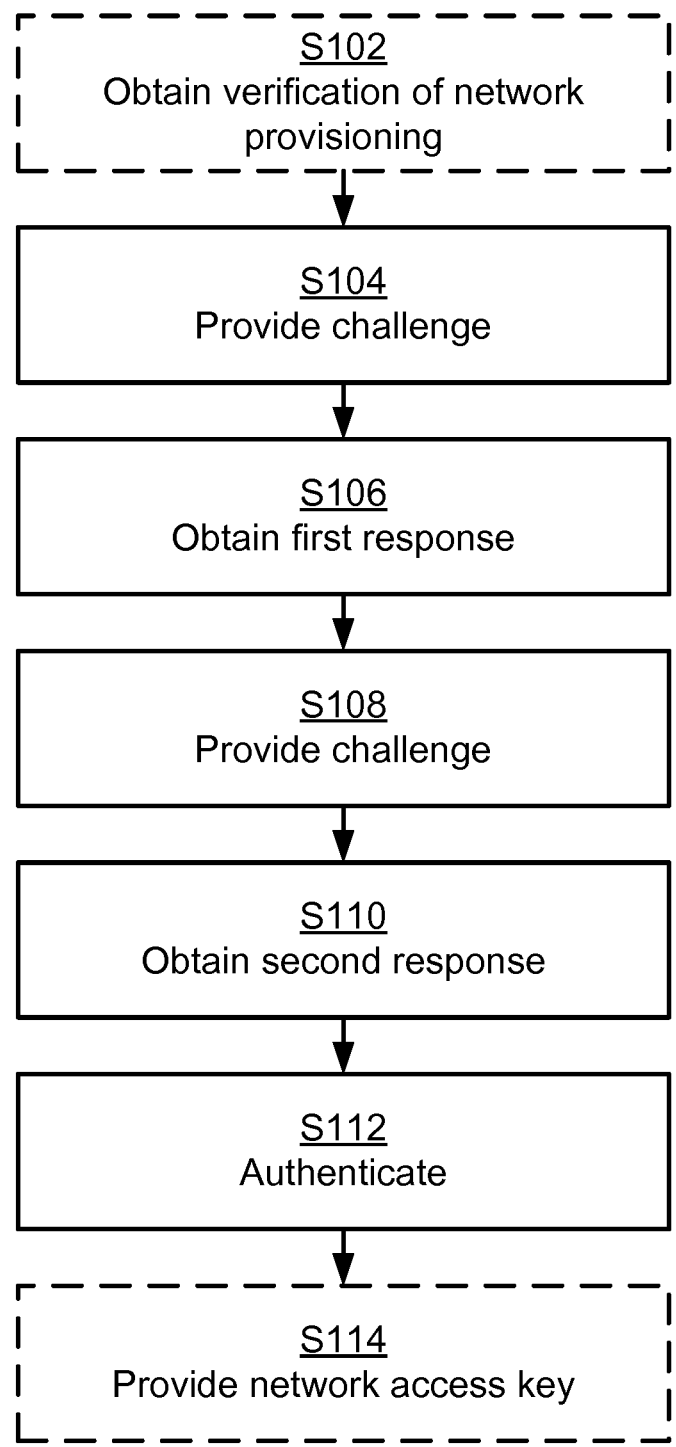
FIGS. 2, 3, and 4 are flowcharts of methods according to embodiments.

Reference is now made to FIG. 2 illustrating a method for authenticating an OEM entity 400 as manufacturer of a communication device 600 comprising an identification module 300 as performed by the network entity 200 according to an embodiment.

The network entity 200 contacts the identification module 300 and requests the identification module 300 to respond to a challenge. Particularly, the network entity 200 is configured to perform step S104:

S104: The network entity 200 provides, towards the identification module 300, a challenge of a challenge-response authentication procedure.

It is assumed that the identification module 300 responds to the challenge. Hence, the network entity 200 is configured to perform step S106:

S106: The network entity 200 obtains, from the identification module 300, a first response of the challenge-response authentication procedure.

The network entity 200 contacts the OEM entity 400 and requests the OEM entity 400 to respond to the same challenge. Particularly, the network entity 200 is configured to perform step S108:

S108: The network entity 200 provides, towards the OEM entity 400 and upon having obtained the response, the challenge.

It is assumed that the OEM entity 400 responds to the challenge. Hence, the network entity 200 is configured to perform step S110:

S110: The network entity 200 obtains, from the OEM entity 400, a second response of the challenge-response authentication procedure.

The network entity 200 has thus obtained two responses to the challenge; a first response from the identification module 300 and a second response from the OEM entity 400. The authenticity of the OEM entity 400 can then be verified by comparing the second response to the first response. Particularly, the network entity 200 is configured to perform step S112:

S112: The network entity 200 authenticates the OEM entity 400 as the manufacturer of the communication device 600 only when the second response matches the first response.

Thus, the authentication fails when the second response fails to match the first response.

Embodiments relating to further details of authenticating the OEM entity 400 as manufacturer of the communication device 600 comprising the identification module 300 as performed by the network entity 200 will now be disclosed.

In some aspects the challenge in step S104 is only provided towards the identification module 300 when the network entity 200 has verified that the identification module 300 has been provisioned. Particularly, according to an embodiment the network entity 200 is configured to perform (optional) step S102:

S102: The network entity 200 obtains a verification of network provisioning of the identification module 300. The challenge is then only provided towards the identification module 300 upon the network entity 200 having obtained the verification.

There could be different types of verifications for the network entity 200 to obtain. In some aspects the network provisioning of the identification module 300 is defined by that a key, K_OEM, has been provisioned for the communication device 600. Particularly, according to an embodiment the verification is obtained by querying a ledger 700 that the key K_OEM has been provisioned for the communication device 600. Further in this respect, the manufacturing entity 500 might publish in the ledger 700 that the identification module 300 has been provisioned with a key for a specific OEM string. Further in this respect, although a ledger 700 is used as an example where data can be stored, parts or all data can be stored elsewhere, i.e. not in the ledger 700 itself, and then the ledger 700 only will store a secure fingerprint, e.g. a cryptographic hash, such as Secure Hash Algorithm 256 (SHA-256) or the like, of the data that is stored elsewhere. When the identification module 300 is provided as an iUICC, the OEM entity 400 might also assume the role of manufacturing entity 500.

In some aspects the challenge is accompanied by OEM specific data. The first response is then based on the OEM specific data. There could be different examples of OEM specific data.

In general terms, the OEM specific data is associated with, or coupled to, the OEM entity 400. That is, the OEM specific data identifies a particular OEM and is hence unique for all OEM entities 400 for this particular OEM. In some non-limiting examples the OEM specific data relates to any of: the name, or other types of identity, of the MNO entity 400, a serial number of the communication device 600 (as provided by the MNO entity 400), Mobile Country Code (MCC) and Mobile Network Code (MNC) of the OEM, organization number of the OEM, Fully Qualified Domain Name (FQDN) of the OEM, name of production site, address or other contact information of the OEM, device model number or type of the communication device 600.

In some aspects, when the network entity 200 is an MNO entity 200b, the network entity 200 provides a network access key towards the identification module 300. Particularly, according to an embodiment the network entity 200 is configured to perform (optional) step S114:

S114: The network entity 200 provides, towards the identification module 300, a network access key upon having authenticated the OEM entity 400 as the manufacturer of the communication device 600.

The network entity 200 could further request the identification module 300 to confirm delivery of the network access key.

There could be different examples of network access keys. According to some examples the network access key is an Authentication Key Agreement (AKA) symmetric credential, or an Extensible Authentication Protocol Transport Layer Security (EAP-TLS) public-key credential.

Figure 3:
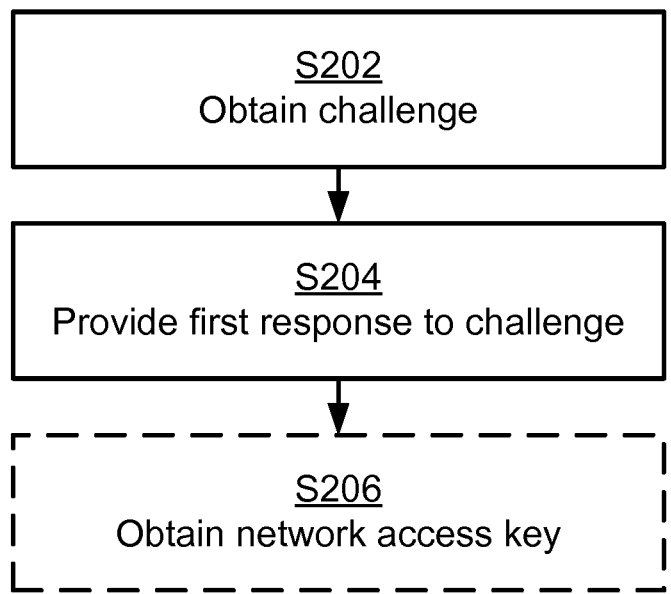

Reference is now made to FIG. 3 illustrating a method for authenticating an OEM entity 400 as manufacturer of a communication device 600 comprising an identification module 300 as performed by the identification module 300 according to an embodiment.

As disclosed above, the network entity 200 provides a challenge towards the identification module 300. It is assumed that the identification module 300 obtains the challenge. Thus the identification module 300 is configured to perform step S202:

S202: The identification module 300 obtains, from a network entity 200, a challenge of a challenge-response authentication procedure.

It is assumed that the identification module 300 responds to the challenge. Particularly, the identification module 300 is configured to perform step S204:

S204: The identification module 300 provides, towards the network entity 200, a first response of the challenge-response authentication procedure.

Embodiments relating to further details of authenticating the OEM entity 400 as manufacturer of the communication device 600 comprising the identification module 300 as performed by the identification module 300 will now be disclosed.

As disclosed above, in some aspects the challenge is accompanied by OEM specific data, and the first response is derived based on the OEM specific data. Different examples of OEM specific have been given above.

There could be different ways for the identification module 300 to derive the first response that is provided towards the network entity 200 in step S204.

In some aspects the identification module 300 derives a key K_OEM as part of deriving the first response. In some examples the key K_OEM is derived based on the OEM specific data and a long-term key K. The first response is then derived based on the key K_OEM and the challenge.

As disclosed above, in some aspects when the network entity 200 is an MNO entity 200b, the network entity 200 provides a network access key towards the identification module 300. Particularly, according to an embodiment the identification module 300 is configured to perform (optional) step S206:

S206: The identification module 300 obtains, from the network entity 200, a network access key upon having authenticated the OEM entity 400 as the manufacturer of the communication device 600.

As disclosed above, the network access key could be an AKA symmetric credential, or an EAP-TLS public-key credential.

Figure 4:
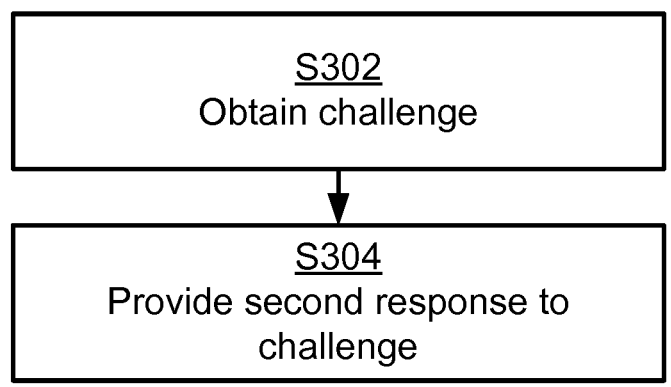

Reference is now made to FIG. 4 illustrating a method for authenticating an OEM entity 400 as manufacturer of a communication device 600 comprising an identification module 300 as performed by the OEM entity 400 according to an embodiment.

As disclosed above, the network entity 200 provides a challenge towards the OEM entity 400. It is assumed that the OEM entity 400 obtains the challenge. Thus the OEM entity 400 is configured to perform step S302:

S302: The OEM entity 400 obtains, from a network entity 200, a challenge of a challenge-response authentication procedure.

It is assumed that the OEM entity 400 responds to the challenge. Particularly, the OEM entity 400 is configured to perform step S304:

S304: The OEM entity 400 provides, towards the network entity 200, a second response of the challenge-response authentication procedure.

Embodiments relating to further details of authenticating the OEM entity 400 as manufacturer of the communication device 600 comprising the identification module 300 as performed by the OEM entity 400 will now be disclosed.

There could be different ways for the OEM entity 400 to derive the second response that is provided towards the network entity 200 in step S304. In some aspects the OEM entity 400 derives the second response from the key K_OEM and the challenge. There could be different ways for the OEM entity 400 to obtain the key K_OEM. In some aspects the key K_OEM is obtained from the manufacturing entity 500 of the identification module 300. Further in this respect, when the OEM entity 400 obtains, or provisions, the identification module 300 from the manufacturing entity 500, the OEM entity 400 might also requests a key (i.e., the key K_OEM) as derived from the long term key K stored on the identification module 300, where the key K_OEM is derived as K_OEM=KDF(K, "OEM string"), where KDF is a Key Derivation Function, and "OEM string" represents OEM specific data.

One particular embodiment for authenticating an OEM entity 400 as manufacturer of a communication device 600 comprising an identification module 300 based on at least some of the above disclosed embodiments will now be disclosed in detail with reference to the signaling diagrams of FIGS. 5(a), 5(b), 5(c), and 5(d).

Figure 5A:
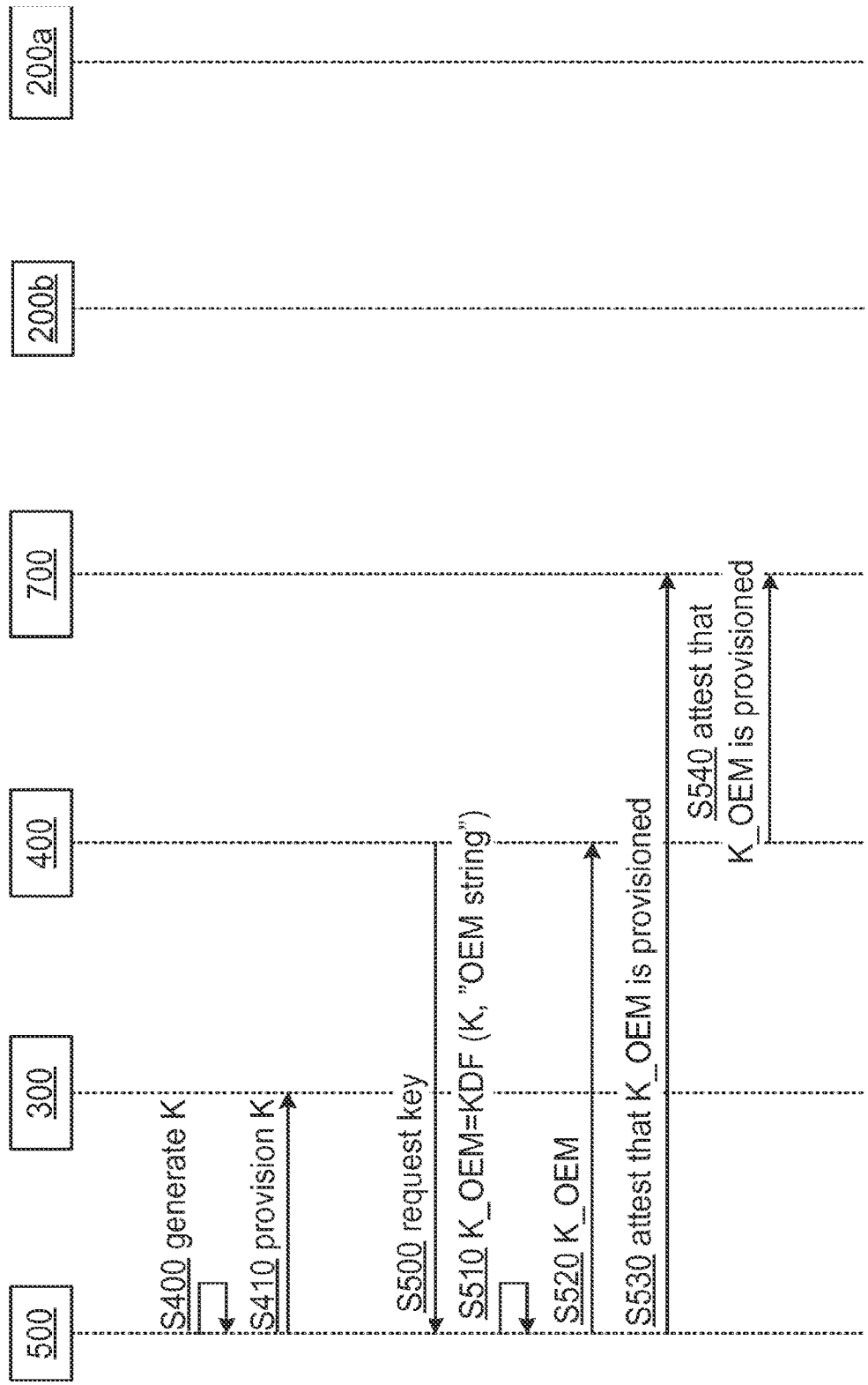
FIG. 5 shows signaling diagrams according to embodiments.

Steps S400-S410 of FIG. 5(a) are performed as part of producing the identification module 300.

S400: The manufacturing entity 500 generates a long-term key K for the identification module 300.

S410: The manufacturing entity 500 provisions the identification module 300 with the key K.

Steps S500-S540 of FIG. 5(a) are performed as part of providing the identification module 300 from the manufacturing entity 500 to the OEM entity 400.

S500: The OEM entity 400 requests a key from the manufacturing entity 500.

S510: The manufacturing entity 500 derives the key K_OEM as K_OEM=KDF(K, "OEM string").

S520: The manufacturing entity 500 provisions the OEM entity 400 with the key K_OEM.

S530: The manufacturing entity 500 attests in a ledger 400 that the key K_OEM has been provisioned.

Figure 5B:
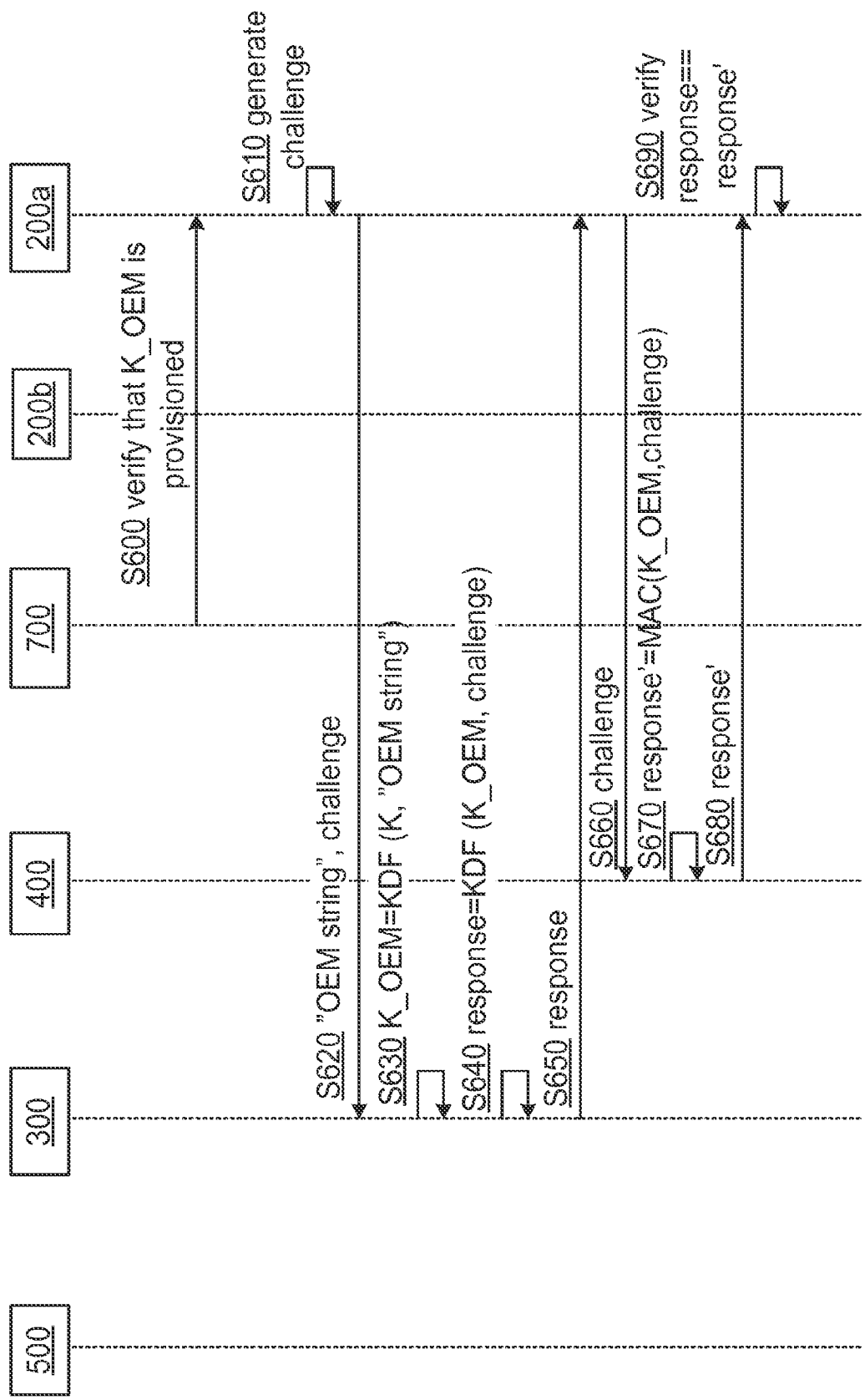

S540: The OEM entity 400 attests in the ledger 400 that the key K_OEM has been provisioned Steps S600-S690 of FIG. 5(b) are performed as part of authenticating the OEM entity 400 by the device owner entity 200a.

S600: The device owner entity 200a verifies that the identification module 300 has been provisioned by checking in the ledger 400 that the key K_OEM for the identification module 300 has been provisioned.

S610: The device owner entity 200a generates a challenge of a challenge-response authentication procedure.

S620: The device owner entity 200a provides the challenge and OEM specific data in the form of "OEM string" towards the identification module 300.

S630: The identification module 300 derives K_OEM from the key K and the "OEM string" as K_OEM=KDF(K, "OEM string").

S640: The identification module 300 derives a first response to the challenge from the key K_OEM and the challenge as response=KDF(K_OEM, challenge).

S650: The identification module 300 provides the first response towards the device owner entity 200a.

S660: The device owner entity 200a provides the challenge towards the OEM entity 400.

S670: The OEM entity 400 derives a second response to the challenge from the key K_OEM and the challenge as response'=MAC(K_OEM, challenge), where MAC is short for message authentication code.

S680: The OEM entity 400 provides the second response towards the device owner entity 200a.

S690: The device owner entity 200a verifies that the second response matches the first response. If there is a match between the responses the device owner entity 200a can be assured that the OEM entity 400 is indeed the true manufacturer of the communication device 600 comprising the identification module 300.

Figure 5C:
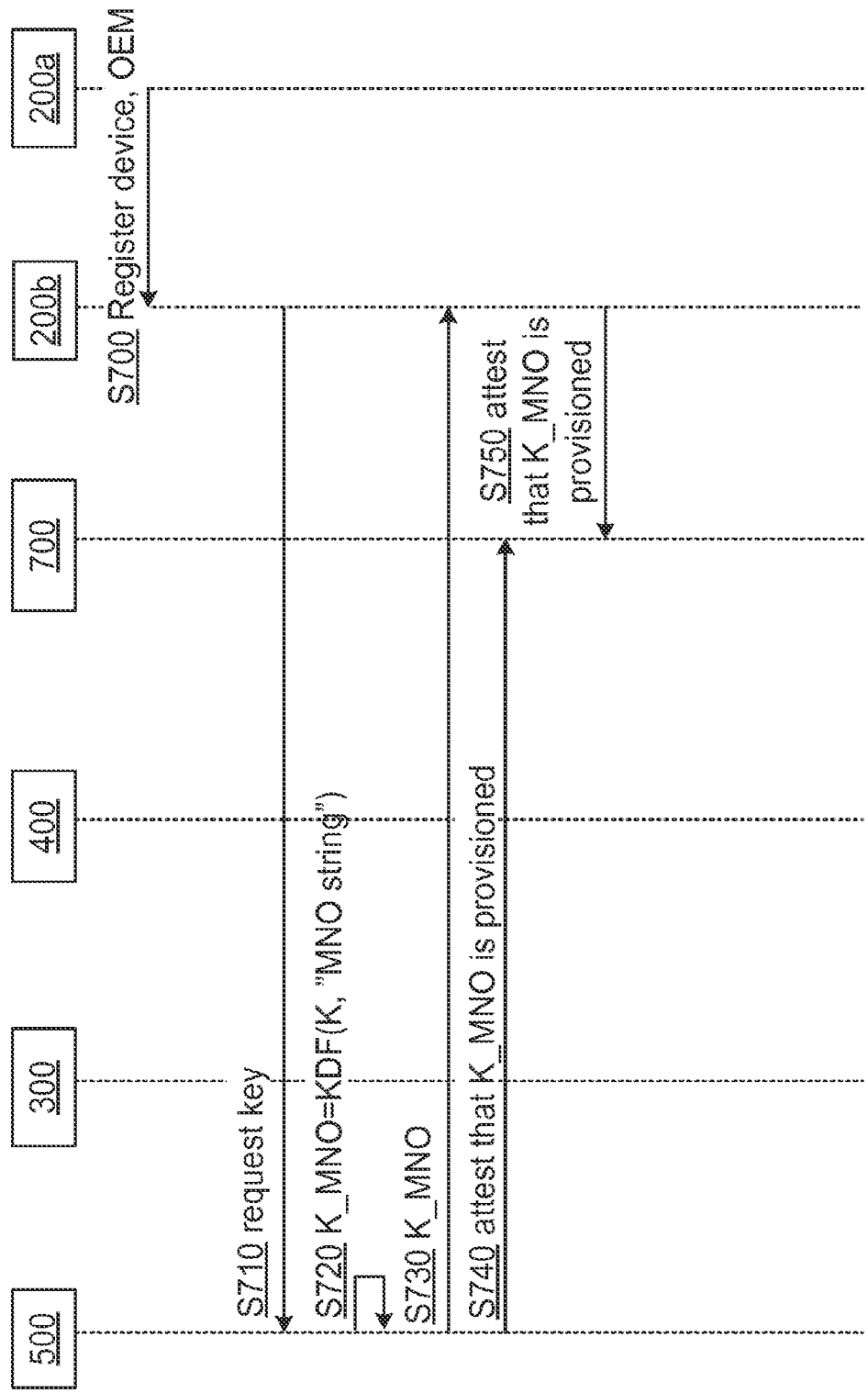

Steps S700-S750 of FIG. 5(c) are performed as part of creating a network subscription by the device owner entity 200a with the MNO entity 200b.

S700: The device owner entity 200a registers the communication device 600 and the OEM entity 400 with the MNO entity 200b.

S710: The MNO entity 200b requests a key from the manufacturing entity 500.

S720: The manufacturing entity 500 derives the key K_MNO as K_MNO=KDF(K, "MNO string") where "MNO string" represents MNO specific data.

S730: The manufacturing entity 500 provides the MNO entity 200b with the key K_MNO.

S740: The manufacturing entity 500 attests in a ledger 400 that the key K_MNO has been provisioned.

S750: The MNO entity 200b attests in the ledger 400 that the key K_MNO has been provisioned.

The OEM entity 400 is thereby enabled to authenticate that the communication device 600 is trustworthy and if so provision a network access key (which for a 5G system can be an AKA symmetric credential or an EAP-TLS public-key credential).

The MNO entity 200b is thereby enabled to establish a key, here referred to to as the key K_MNO, that could be used for secure and integrity protected provision.

Figure 5D:
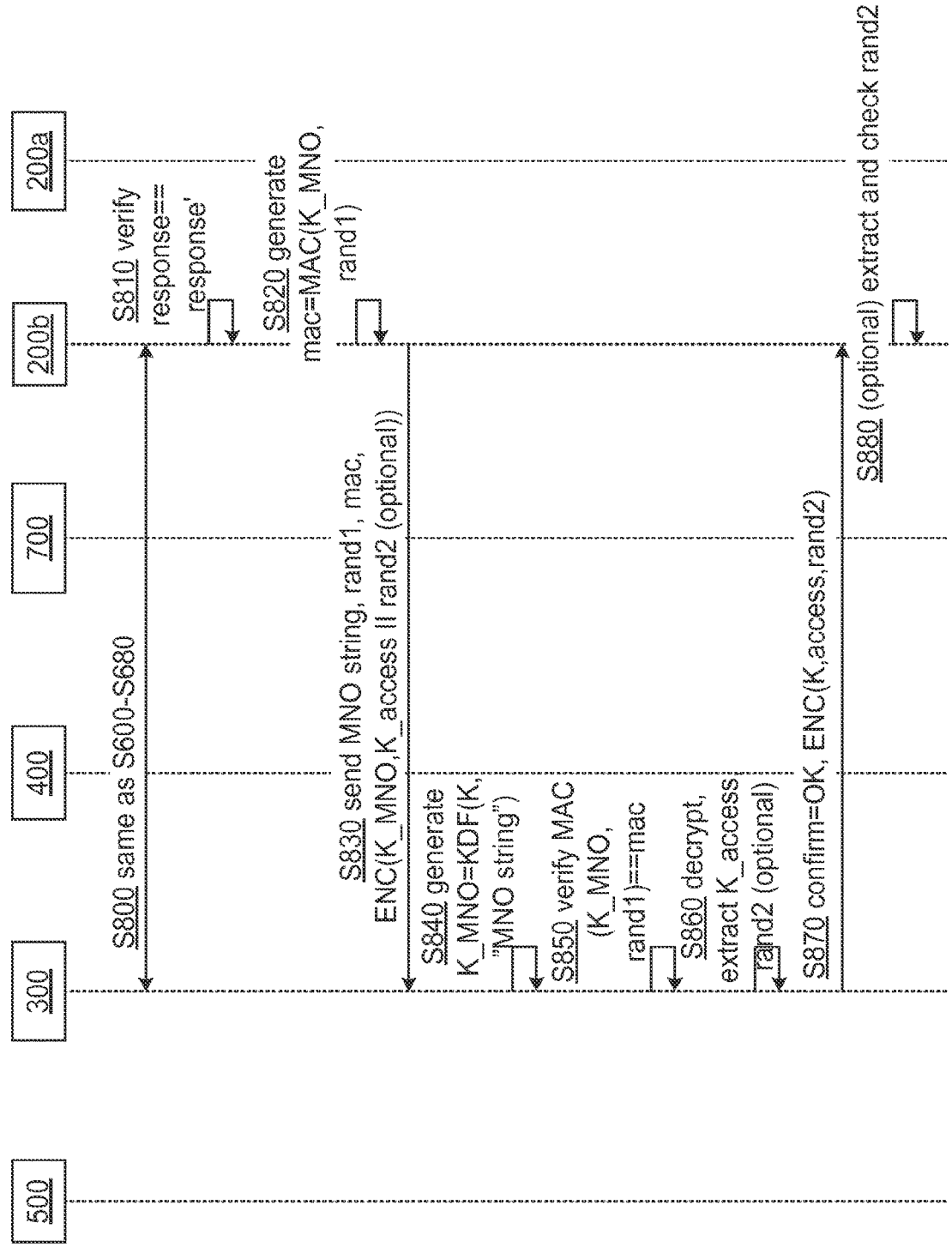

Steps S800-S880 of FIG. 5(d) are performed as part of providing the identification module 300 with a network access key from the MNO entity 200b.

S800: Steps S600-S680 are performed but involving the MNO entity 200b instead of the device owner entity 200a.

S810: The MNO entity 200b verifies that the second response matches the first response. If there is a match between the responses the MNO entity 200b can be assured that the OEM entity 400 is indeed the true manufacturer of the communication device 600 comprising the identification module 300.

S820: The MNO entity 200b generates a message authentication code as mac=MAC(K_MNO_rand1), where rand1 is a random number.

S830: The MNO entity 200b provides "MNO string", rand1, mac, and ENC(K_MNO, K_access∥rand2 (optional)) towards the identification module 300, where ENC is short for encryption, where K_access is the network access key, and where "x∥y" denotes the concatenation of strings x and y.

S840: The identification module 300 generates K_MNO as K_MNO=KDF(K, "MNO string").

S850: The identification module 300 verifies that the received mac is equal to MAC(K_MNO, rand1)

S860: The identification module 300 decrypts ENC (K_MNO, K_access∥rand2 (optional)) and extracts K_access and rand2 (optionally).

S870: The identification module 300 provides a confirmation (by stating confirmation=OK) and ENC(K_access rand2 (optional)) towards the MNO entity 200b.

S880 (optional): The MNO entity 200b checks the confirmation and extracts rand2.

The K_MNO can thereby be used in process for provisioning of K_access that follows the GSMA Remote Subscription Provisioning (RSP) protocol (where GSMA is short for GSM Association, and where GSM is short for Global system for Mobile communication), e.g. by providing the credentials needed in the RSP protocol.

The procedure for delivery of K_access can be adopted in case the implementation, or realization, of the identification module 300 is incapable of handling long messages. For example, the steps 830 to 880 could be broken up into smaller parts.

Figure 6:
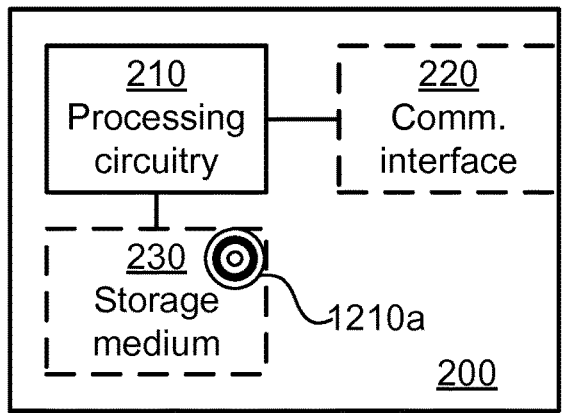
FIG. 6 is a schematic diagram showing functional units of a network entity according to an embodiment.

FIG. 6 schematically illustrates, in terms of a number of functional units, the components of a network entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network entity 200 to perform a set of operations, or steps, as disclosed above. For example, the storage medium 230 may store the set of operations, and the processing circuitry 210 may be configured to retrieve the set of operations from the storage medium 230 to cause the network entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network entity 200 may further comprise a communications interface 220 for communications with other entities, functions, nodes, modules, and devices. As such the communications interface 220 may comprise one or more transmitters and receivers, comprising analogue and digital components.

The processing circuitry 210 controls the general operation of the network entity 200 e.g. by sending data and control signals to the communications interface 220 and the storage medium 230, by receiving data and reports from the communications interface 220, and by retrieving data and instructions from the storage medium 230. Other components, as well as the related functionality, of the network entity 200 are omitted in order not to obscure the concepts presented herein.

Figure 7:
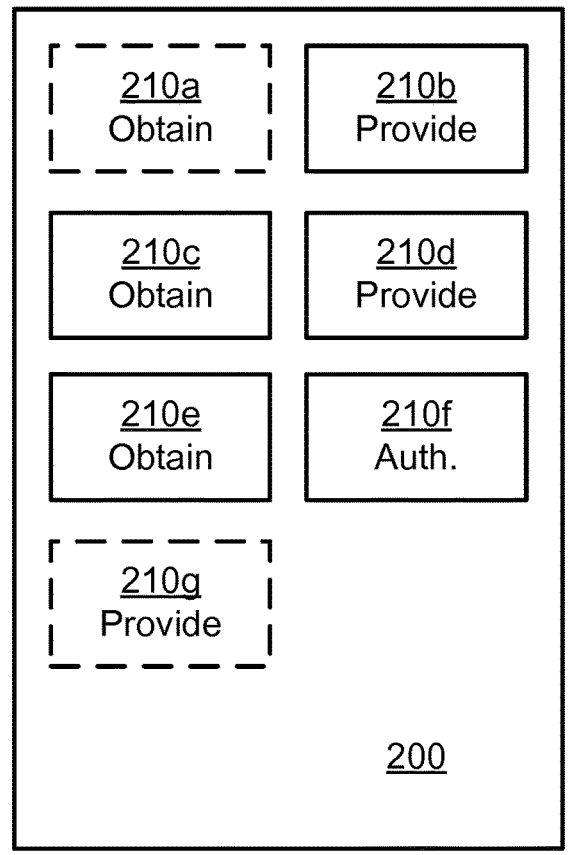
FIG. 7 is a schematic diagram showing functional modules of a network entity according to an embodiment.

FIG. 7 schematically illustrates, in terms of a number of functional modules, the components of a network entity 200 according to an embodiment. The network entity 200 of FIG. 7 comprises a number of functional modules; a provide module 210b configured to perform step S204, an obtain module 210c configured to perform step S206, a provide module 210d configured to perform step S208, an obtain module 210e configured to perform step S210 and an authenticate module 210f configured to perform step S112. The network entity 200 of FIG. 7 may further comprise a number of optional functional modules, such as any of an obtain module 210a configured to perform step S102 and a provide module 210g configured to perform step S114. In general terms, each functional module 210a-210g may be implemented in hardware or in software. Preferably, one or more or all functional modules 210a-210g may be implemented by the processing circuitry 210, possibly in cooperation with the communications interface 220 and the storage medium 230. The processing circuitry 210 may thus be arranged to from the storage medium 230 fetch instructions as provided by a functional module 210a-210g and to execute these instructions, thereby performing any steps of the network entity 200 as disclosed herein.

Figure 8:
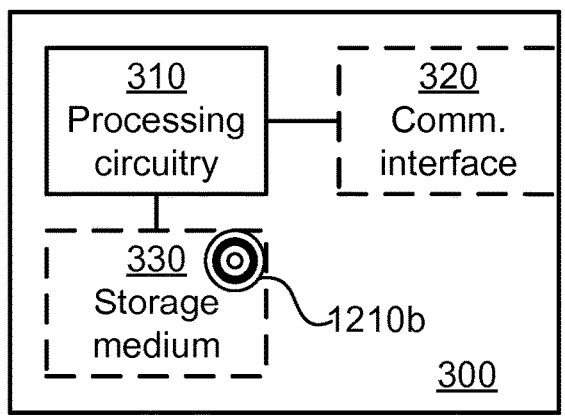
FIG. 8 is a schematic diagram showing functional units of an identification module according to an embodiment.

FIG. 8 schematically illustrates, in terms of a number of functional units, the components of an identification module 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the identification module 300 to perform a set of operations, or steps, as disclosed above. For example, the storage medium 330 may store the set of operations, and the processing circuitry 310 may be configured to retrieve the set of operations from the storage medium 330 to cause the identification module 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The identification module 300 may further comprise a communications interface 320 for communications with other modules, entities, functions, nodes, and devices. As such the communications interface 320 may comprise one or more transmitters and receivers, comprising analogue and digital components.

The processing circuitry 310 controls the general operation of the identification module 300 e.g. by sending data and control signals to the communications interface 320 and the storage medium 330, by receiving data and reports from the communications interface 320, and by retrieving data and instructions from the storage medium 330. Other components, as well as the related functionality, of the identification module 300 are omitted in order not to obscure the concepts presented herein.

Figure 9:
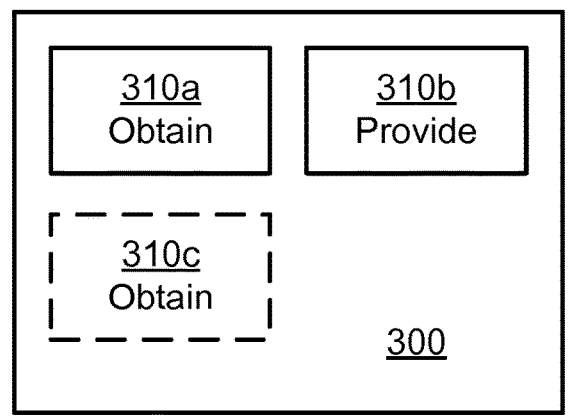
FIG. 9 is a schematic diagram showing functional modules of an identification module according to an embodiment.

FIG. 9 schematically illustrates, in terms of a number of functional modules, the components of an identification module 300 according to an embodiment. The identification module 300 of FIG. 9 comprises a number of functional modules; an obtain module 310a configured to perform step S202 and a provide module 310b configured to perform step S204. The identification module 300 of FIG. 9 may further comprise a number of optional functional modules, such as an obtain module 310c configured to perform step S206. In general terms, each functional module 310a-310c may be implemented in hardware or in software. Preferably, one or more or all functional modules 310a-310c may be implemented by the processing circuitry 310, possibly in cooperation with the communications interface 320 and the storage medium 330. The processing circuitry 310 may thus be arranged to from the storage medium 330 fetch instructions as provided by a functional module 310a-310c and to execute these instructions, thereby performing any steps of the identification module 300 as disclosed herein.

Figure 10:
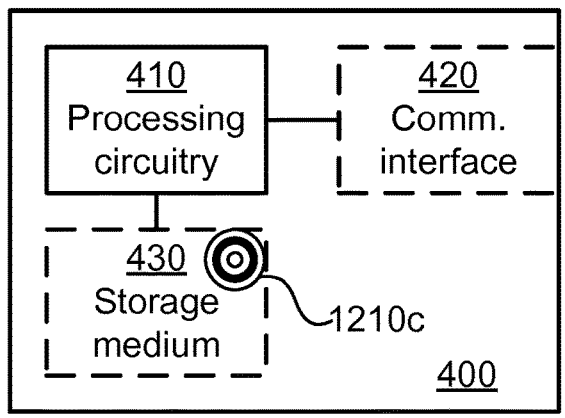
FIG. 10 is a schematic diagram showing functional units of an OEM entity according to an embodiment.

FIG. 10 schematically illustrates, in terms of a number of functional units, the components of an OEM entity 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1210c (as in FIG. 12), e.g. in the form of a storage medium 430. The processing circuitry 410 may further be provided as at least one application specific integrated circuit (ASIC), or field programmable gate array (FPGA).

Particularly, the processing circuitry 410 is configured to cause the OEM entity 400 to perform a set of operations, or steps, as disclosed above. For example, the storage medium 430 may store the set of operations, and the processing circuitry 410 may be configured to retrieve the set of operations from the storage medium 430 to cause the OEM entity 400 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The OEM entity 400 may further comprise a communications interface 420 for communications with other entities, functions, nodes, and devices. As such the communications interface 420 may comprise one or more transmitters and receivers, comprising analogue and digital components.

The processing circuitry 410 controls the general operation of the OEM entity 400 e.g. by sending data and control signals to the communications interface 420 and the storage medium 430, by receiving data and reports from the communications interface 420, and by retrieving data and instructions from the storage medium 430. Other components, as well as the related functionality, of the OEM entity 400 are omitted in order not to obscure the concepts presented herein.

Figure 11:
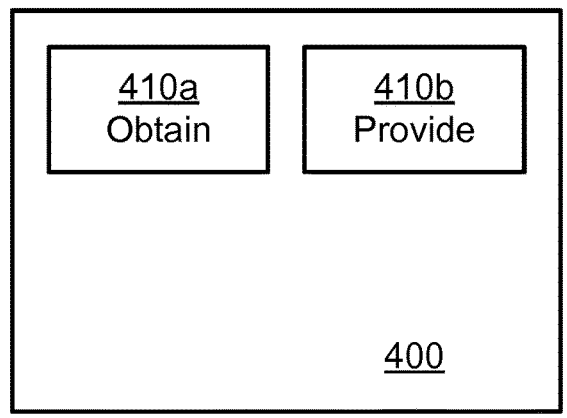
FIG. 11 is a schematic diagram showing functional modules of an OEM entity according to an embodiment.

FIG. 11 schematically illustrates, in terms of a number of functional modules, the components of an OEM entity 400 according to an embodiment. The OEM entity 400 of FIG. 11 comprises a number of functional modules; an obtain module 410a configured to perform step S302 and a provide module 410b configured to perform step S304. The OEM entity 400 of FIG. 11 may further comprise a number of optional functional modules. In general terms, each functional module 410a-410b may be implemented in hardware or in software. Preferably, one or more or all functional modules 410a-410b may be implemented by the processing circuitry 410, possibly in cooperation with the communications interface 420 and the storage medium 430. The processing circuitry 410 may thus be arranged to from the storage medium 430 fetch instructions as provided by a functional module 410a-410b and to execute these instructions, thereby performing any steps of the OEM entity 400 as disclosed herein.

The network entity 200, identification module 300, and/or OEM entity 400 may be provided as standalone devices or as a part of at least one further device. Alternatively, functionality of the network entity 200, identification module 300, and/or OEM entity 400 may be distributed between at least two devices, or nodes. These at least two nodes, or devices, may either be part of the same network part or may be spread between at least two such network parts. Thus, a first portion of the instructions performed by the network entity 200, identification module 300, and/or OEM entity 400 may be executed in a first device, and a second portion of the of the instructions performed by the network entity 200, identification module 300, and/or OEM entity 400 may be executed in a second device; the herein disclosed embodiments are not limited to any particular number of devices on which the instructions performed by the network entity 200, identification module 300, and/or OEM entity 400 may be executed. Hence, the methods according to the herein disclosed embodiments are suitable to be performed by a network entity 200, identification module 300, and/or OEM entity 400 residing in a cloud computational environment. Therefore, although a single processing circuitry 210, 310, 410 is illustrated in FIGS. 6, 8 10 the processing circuitry 210, 310, 410 may be distributed among a plurality of devices, or nodes. The same applies to the functional modules 210a-210g, 310a-310c, 410a-410b of FIGS. 7, 9 and 11, and the computer programs 1220a, 1220b of FIG. 12.

Figure 12:
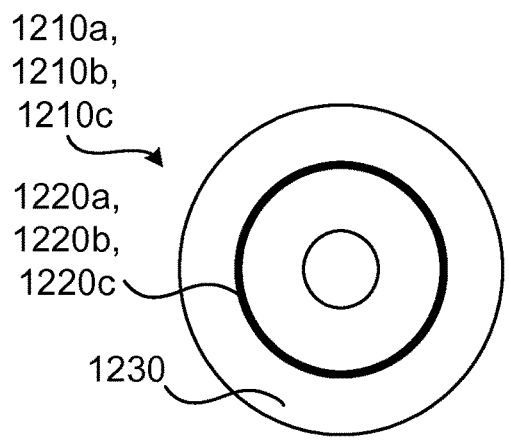
FIG. 12 shows one example of a computer program product comprising computer readable means according to an embodiment.

FIG. 12 shows one example of a computer program product 1210a, 1210b, 1210c comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the network entity 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the identification module 300 as herein disclosed. On this computer readable means 1230, a computer program 1220c can be stored, which computer program 1220c can cause the processing circuitry 410 and thereto operatively coupled entities and devices, such as the communications interface 420 and the storage medium 430, to execute methods according to embodiments described herein. The computer program 1220c and/or computer program product 1210c may thus provide means for performing any steps of the OEM entity 400 as herein disclosed.

In the example of FIG. 12, the computer program product 1210a, 1210b, 1210c is illustrated as an optical disc, such as a CD (compact disc) or a DVD (digital versatile disc) or a Blu-Ray disc. The computer program product 1210a, 1210b, 1210c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b, 1220c is here schematically shown as a track on the depicted optical disk, the computer program 1220a, 1220b, 1220c can be stored in any way which is suitable for the computer program product 1210a, 1210b, 1210c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for authenticating an Original Equipment Manufacturer (OEM), entity as manufacturer of a communication device comprising an identification module, the method being performed by a network entity, the method comprising:
providing, towards the identification module, a challenge of a challenge-response authentication procedure;
obtaining, from the identification module, a first response of the challenge-response authentication procedure;
providing, towards the OEM entity and upon having obtained the response, the challenge, the challenge accompanied by OEM specific data and the first response based on the OEM specific data, the OEM specific data relating to any of: identity of the MNO entity, Mobile Country Code and Mobile Network Code of the OEM, organization number of the OEM, Fully Qualified Domain Name of the OEM, name of production site of the communication device, address or other contact information of the OEM, device model number or type of the communication device;
obtaining, from the OEM entity, a second response of the challenge-response authentication procedure; and
authenticating the OEM entity as the manufacturer of the communication device only when the second response matches the first response.

2. The method according to claim 1, further comprising:
obtaining, a verification of network provisioning of the identification module, wherein the challenge only is provided towards the identification module upon having obtained the verification.

3. The method according to claim 2, wherein the verification is obtained by querying a ledger that a key K_OEM has been provisioned for the communication device.

4. The method according to claim 1, wherein the network entity is a device owner entity or a mobile network operator entity.

5. The method according to claim 1, further comprising, when the network entity is a mobile network operator entity:
providing, towards the identification module, a network access key upon having authenticated the OEM entity as the manufacturer of the communication device.

6. The method according to claim 5, wherein the network access key is an Authentication Key Agreement (AKA), symmetric credential, or an Extensible Authentication Protocol Transport Layer Security (EAP-TLS), public-key credential.

7. A method for authenticating an Original Equipment Manufacturer (OEM), entity as manufacturer of a communication device comprising an identification module, the method being performed by the identification module, the method comprising:
obtaining, from a network entity, a challenge of a challenge-response authentication procedure; and
providing, towards the network entity, a first response of the challenge-response authentication procedure, the challenge accompanied by OEM specific data and the first response derived based on the OEM specific data, the OEM specific data relating to any of: identity of the MNO entity, Mobile Country Code and Mobile Network Code of the OEM, organization number of the OEM, Fully Qualified Domain Name of the OEM, name of production site of the communication device, address or other contact information of the OEM, device model number or type of the communication device.

8. The method according to claim 7, wherein a key K_OEM is derived as part of deriving the first response.

9. The method according to claim 8, wherein the key K_OEM derived based on the OEM specific data and a long-term key K, and wherein the first response is derived based on the key K_OEM and the challenge.

10. The method according to claim 7, wherein the identification module is part of, or implemented on, a Trusted Execution Environment (TEE).

11. The method according to claim 7, wherein the identification module is a Universal Integrated Circuit Card (UICC), such as an embedded UICC or an integrated UICC.

12. The method according to claim 7, further comprising, when the network entity is a mobile network operator entity:
obtaining, from the network entity, a network access key upon having authenticated the OEM entity as the manufacturer of the communication device.

13. The method according to claim 12, wherein the network access key is an Authentication Key Agreement (AKA), symmetric credential, or an Extensible Authentication Protocol Transport Layer Security (EAP-TLS), public-key credential.

14. A method for authenticating an Original Equipment Manufacturer (OEM), entity as manufacturer of a communication device comprising an identification module, the method being performed by the OEM entity, the method comprising:
obtaining, from a network entity, a challenge of a challenge-response authentication procedure; and
providing, towards the network entity, a second response of the challenge-response authentication procedure, the challenge accompanied by OEM specific data and the second response derived based on the OEM specific data, the OEM specific data relating to any of: identity of the MNO entity, Mobile Country Code and Mobile Network Code of the OEM, organization number of the OEM, Fully Qualified Domain Name of the OEM, name of production site of the communication device, address or other contact information of the OEM, device model number or type of the communication device.

15. The method according to claim 14, wherein the second response is derived from a key K_OEM and the challenge.

16. The method according to claim 15, wherein the key K_OEM is obtained from a manufacturing entity of the identification module.

17. A method for authenticating an Original Equipment Manufacturer (OEM), entity, as manufacturer of a communication device comprising an identification module, the method comprising:
providing, by a network entity and towards the identification module, a challenge of a challenge-response authentication procedure;
providing, by the identification module and towards the network entity, a first response of the challenge-response authentication procedure;
providing, by the network entity upon having obtained the response and towards the OEM entity, the challenge, the challenge accompanied by OEM specific data and the first response derived based on the OEM specific data, the OEM specific data relating to any of: identity of the MNO entity, Mobile Country Code and Mobile Network Code of the OEM, organization number of the OEM, Fully Qualified Domain Name of the OEM, name of production site of the communication device, address or other contact information of the OEM, device model number or type of the communication device;

providing, by the OEM entity and towards the network entity, a second response of the challenge-response authentication procedure; and authenticating, by the network entity, the OEM entity as the manufacturer of the communication device only when the second response matches the first response.

18. A network entity for authenticating an Original Equipment Manufacturer (OEM), entity, as manufacturer of a communication device comprising an identification module, the network entity comprising processing circuitry, the processing circuitry being configured to cause the network entity to:

provide, towards the identification module, a challenge of a challenge-response authentication procedure;

obtain, from the identification module, a first response of the challenge-response authentication procedure;

provide, towards the OEM entity and upon having obtained the response, the challenge, the challenge accompanied by OEM specific data and the first response derived based on the OEM specific data, the OEM specific data relating to any of: identity of the MNO entity, Mobile Country Code and Mobile Network Code of the OEM, organization number of the OEM, Fully Qualified Domain Name of the OEM, name of production site of the communication device, address or other contact information of the OEM, device model number or type of the communication device;

obtain, from the OEM entity, a second response of the challenge-response authentication procedure; and authenticate the OEM entity as the manufacturer of the communication device only when the second response matches the first response.

\* \* \* \* \*